(12) United States Patent
Williams

(10) Patent No.: US 8,297,894 B1
(45) Date of Patent: Oct. 30, 2012

(54) ATV LOCKING DEVICE

(76) Inventor: Earl Williams, Haughton, LA (US)

( * ) Notice: Subject to any disclaimer, the term of this patent is extended or adjusted under 35 U.S.C. 154(b) by 215 days.

(21) Appl. No.: 12/806,533

(22) Filed: Aug. 13, 2010

Related U.S. Application Data

(60) Provisional application No. 61/234,020, filed on Aug. 14, 2009.

(51) Int. Cl.
*B60P 7/08* (2006.01)

(52) U.S. Cl. ............... 410/7; 410/4; 410/19; 410/30

(58) Field of Classification Search ............... 410/3, 4, 410/7, 9, 19, 20, 22, 30, 49, 97, 2, 10, 11, 410/12, 23; 211/20–22, 24; 224/403, 404, 224/42.38, 553, 570, 549; 188/4 R, 32, 36; 248/503

See application file for complete search history.

(56) References Cited

U.S. PATENT DOCUMENTS

| 6,099,219 A * | 8/2000 | Bartholomay ............... 410/20 |
| 6,938,734 B2 * | 9/2005 | Curl |

* cited by examiner

*Primary Examiner* — Stephen Gordon

(74) *Attorney, Agent, or Firm* — R. Keith Harrison

(57) ABSTRACT

An ATV locking device includes a base frame, at least one wheel abutment plate pivotally carried by the base frame, at least one wheel engaging member pivotally carried by the base frame and at least one locking arm pivotally engaging the at least one wheel abutment plate and the at least one wheel engaging member.

12 Claims, 6 Drawing Sheets

ATV LOCKING DEVICE

CROSS-REFERENCE TO RELATED APPLICATIONS

This application claims the benefit of and incorporates by reference in its entirety U.S. provisional application No. 61/234,020, filed Aug. 14, 2009 and entitled "ATV Handylock".

FIELD

The disclosure generally relates to all-terrain vehicles. More particularly, the disclosure relates to an ATV locking device which facilitates securing of an ATV in a pickup truck bed or trailer for towing of the ATV.

BACKGROUND

All-terrain vehicles (ATVs) are motorized vehicles typically having four or six wheels. The popularity of ATVs has increased considerably in recent years. ATVs are frequently used for recreation or in hunting, camping and other outdoor pursuits to transport game, equipment and the like. ATVs care commonly transported in the bed of a pickup truck or on a flat-bed trailer. However, a lack of suitable methods for securing an ATV in a pickup truck or on a trailer may render the ATV vulnerable to inadvertently rolling in the pickup truck bed or on the trailer during transport. Moreover, failure to properly secure the ATV may render the ATV vulnerable to theft under some circumstances.

Therefore, an ATV locking device which facilitates securing of an ATV in a pickup truck bed or trailer for towing of the ATV is needed.

SUMMARY

The disclosure is generally directed to an ATV locking device. An illustrative embodiment of the ATV locking device includes a base frame, at least one wheel abutment plate pivotally carried by the base frame, at least one wheel engaging member pivotally carried by the base frame and at least one locking arm pivotally engaging the at least one wheel abutment plate and the at least one wheel engaging member.

In some embodiments, the ATV locking device includes a generally rectangular base frame; a pair of spaced-apart wheel abutment plates pivotally carried by a first end of the base frame; a pair of wheel engaging members pivotally carried by a second end of the base frame; and a pair of locking arms pivotally engaging the pair of wheel abutment plates, respectively, and the pair of wheel engaging members, respectively.

In some embodiments, the ATV locking device may include a generally rectangular base frame having a pair of generally parallel, spaced-apart side frame members and a front frame member extending between the side frame members; a pair of spaced-apart wheel abutment plates pivotally carried by the front frame member of the base frame; a pair of wheel engaging members pivotally carried by the side frame members, respectively, of the base frame; a rear frame member carried by the pair of wheel engaging members; and a pair of locking arms pivotally engaging the pair of wheel abutment plates, respectively, and the rear frame member.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. Relative terms such as "front", "rear", "upwardly" and "downwardly" are used for purposes of illustration only and shall not be construed in a limiting sense.

Figure 1:
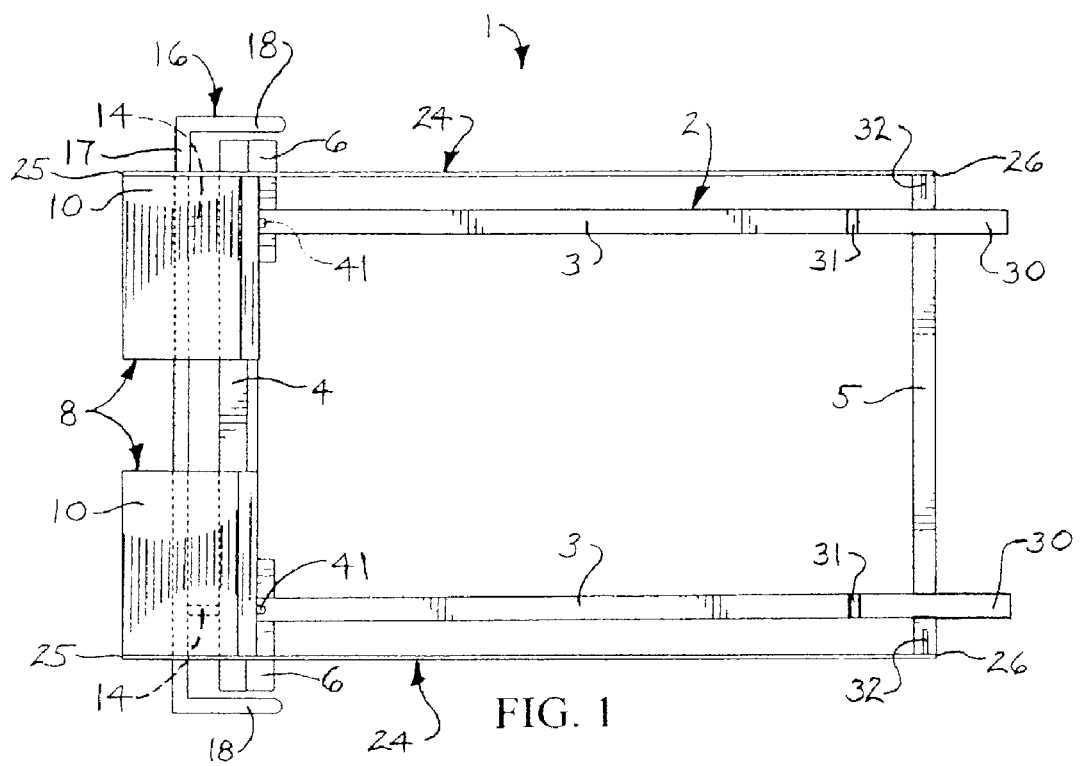
FIG. 1 is a top view of an illustrative embodiment of the ATV locking device.
Figure 5:
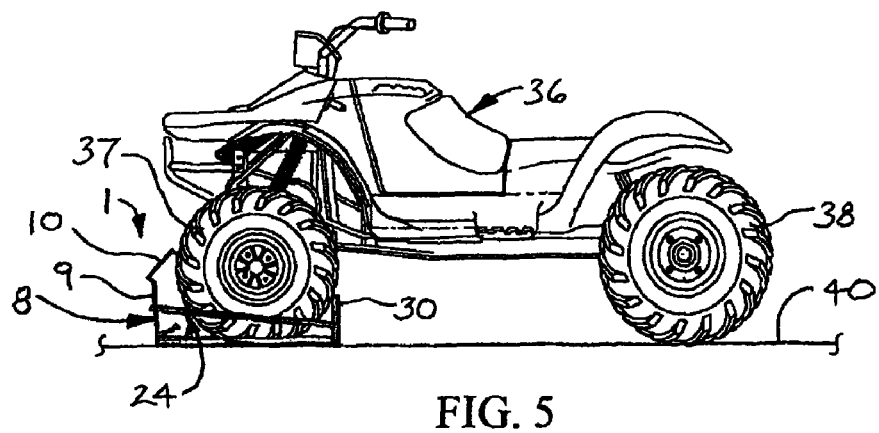
FIG. 5 is a side view of an illustrative embodiment of the ATV locking device, with a front wheel of an ATV locked in the ATV locking device.

Referring to the drawings, an illustrative embodiment of the ATV locking device is generally indicated by reference numeral 1. The ATV locking device 1 includes a base frame 2 which in application of the ATV locking device 1 may be bolted to a support surface 40 (FIG. 5) such as a pickup truck bed or trailer, for example and without limitation. As illustrated in FIG. 1, the base frame 2 may be generally rectangular with a pair of generally elongated, parallel, spaced-apart side frame members 3. A front frame member 4 may extend between the side frame members 3. The base frame 2 may further include a rear frame member 5 the function of which will be hereinafter described. In some embodiments, frame mount plates 6 may be provided on the bottom surface of the base frame 2 to facilitate attachment of the base frame 2 to the support surface 40 using bolts 41 (FIG. 1) or other attachment technique, as will be hereinafter described.

Figure 2:
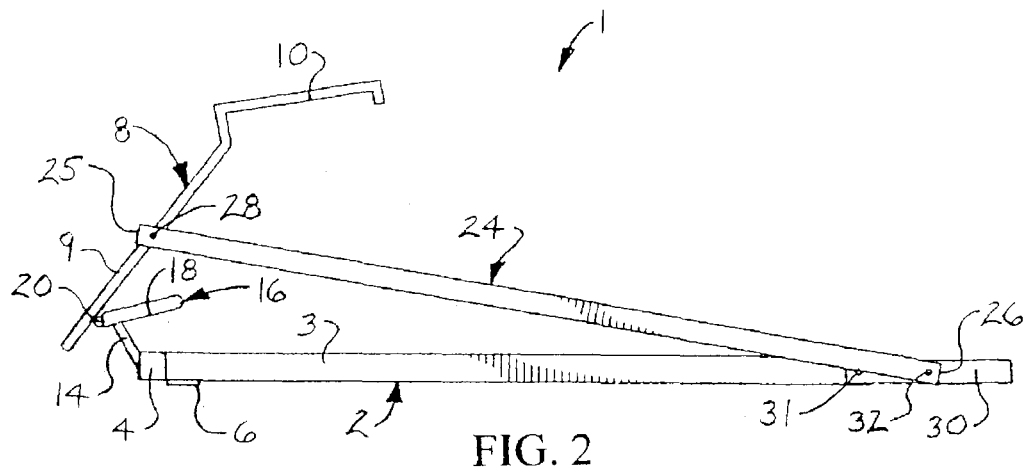
FIG. 2 is a side view of an illustrative embodiment of the ATV locking device, deployed in an unsecured position.
Figure 3:
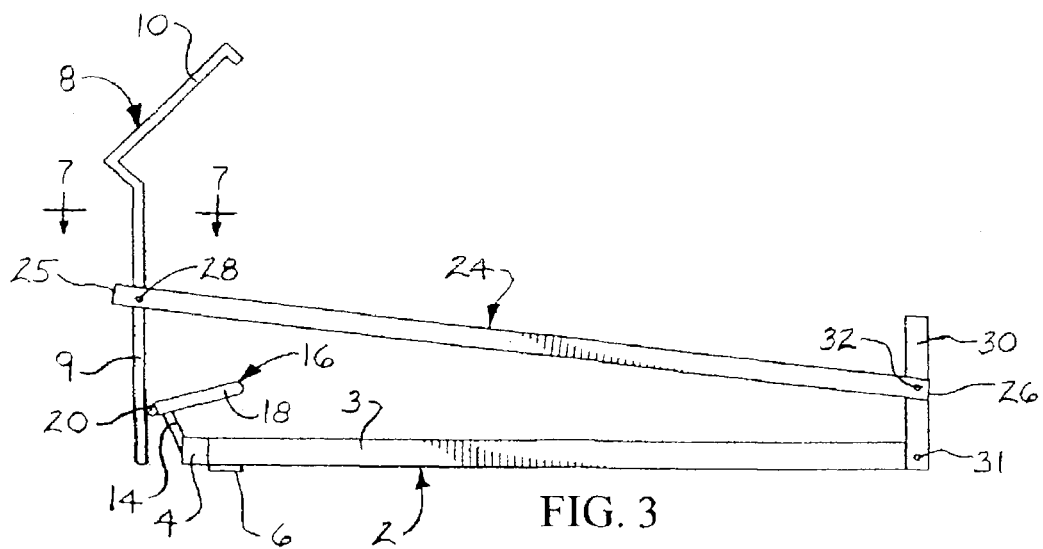
FIG. 3 is a side view of an illustrative embodiment of the ATV locking device, deployed in a secured position.
Figure 7:
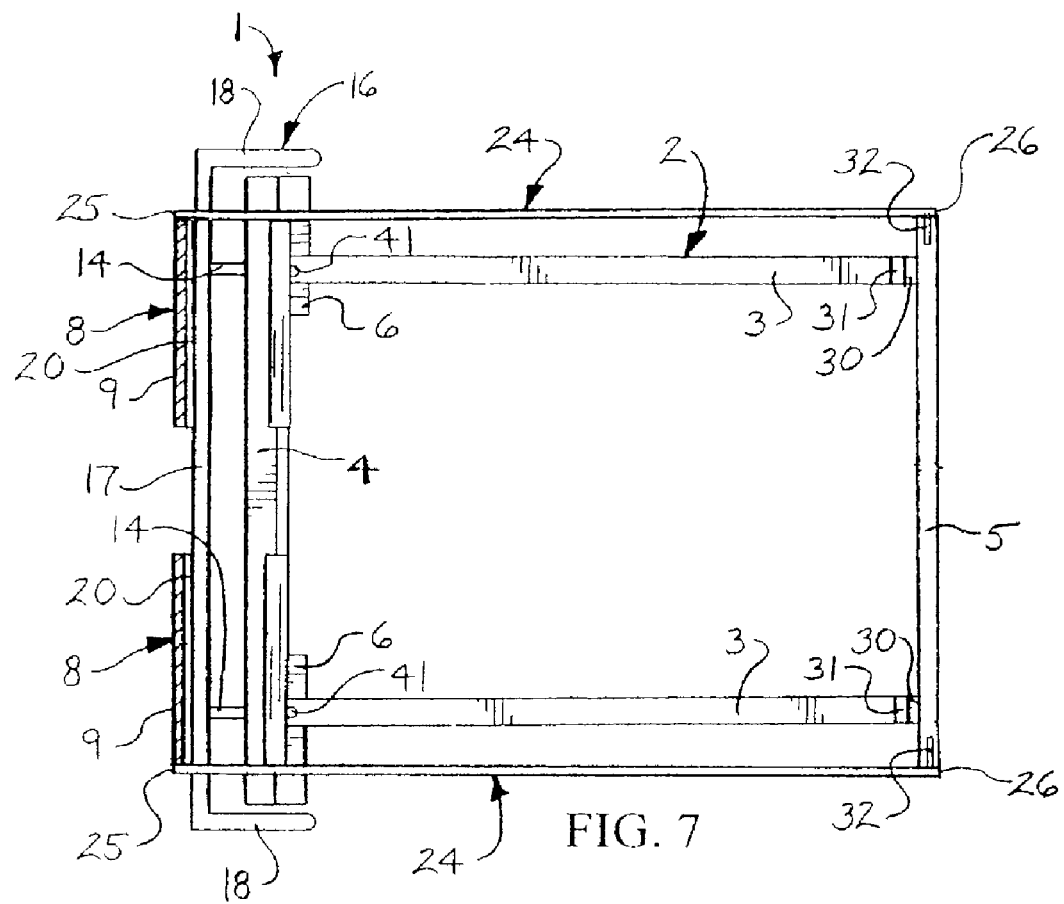
FIG. 7 is a sectional view of an illustrative embodiment of the ATV locking device, taken along section lines 7-7 in FIG. 3.
Figure 8:
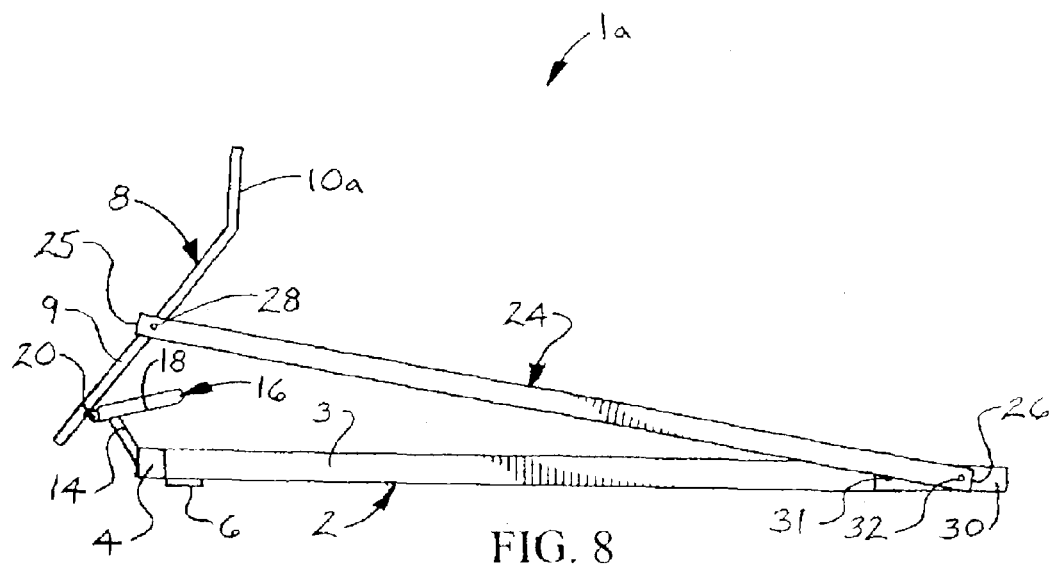
FIG. 8 is a side view of an alternative illustrative embodiment of the ATV locking device, deployed in an unsecured position.
Figure 9:
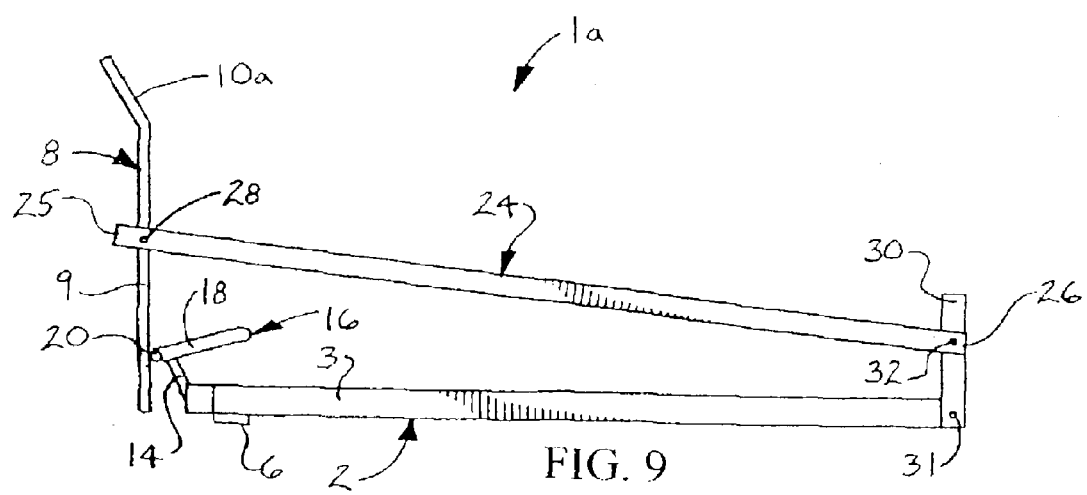
FIG. 9 is a side view of the illustrative embodiment of the ATV locking device illustrated in FIG. 8, deployed in a secured position.

A pair of spaced-apart wheel abutment plates 8 may be pivotally mounted with respect to the base frame 2, as illustrated in FIGS. 2 and 3. Each wheel abutment plate 8 may be pivotally mounted with respect to the base frame 2 according to any technique which is known by those skilled in the art and suitable for the purpose. As illustrated in FIG. 1, in some embodiments, a pair of spaced-apart connecting plates 14 may angle upwardly and forwardly from the front frame member 4 of the base frame 2, as illustrated in FIGS. 2 and 3. A base wheel stop 16 may include an elongated connecting portion 17 (FIG. 1) which is supported by the connecting plates 14 and a pair of spaced-apart, parallel side portions 18 which extend generally rearwardly from the respective ends of the connecting portion 17. As illustrated in FIGS. 2 and 3, each wheel abutment plate 8 may include a generally straight or planar attachment plate portion 9 and a wheel engaging portion 10 which extends from the attachment plate portion 9. The wheel engaging portion 10 may extend generally at an upward and rearward obtuse angle from the attachment plate portion 9. As illustrated in FIGS. 2, 3 and 7, a plate hinge 20 may pivotally attach the attachment plate portion 9 of the wheel abutment plate 8 to the connecting portion 17 of the base wheel stop 16. Accordingly, each wheel abutment plate 8 is capable of pivoting with respect to the base wheel stop 16 between the unsecured position illustrated in FIG. 2 and the secured position illustrated in FIG. 3 for purposes which will be hereinafter described.

A pair of wheel engaging members 30 may be pivotally attached to the respective side frame members 3 of the base frame 2 via frame hinges 31. The rear base member 5 of the base frame 2 may extend between the wheel engaging members 30. The rear base member 5 may be attached to the wheel engaging members 30 via welding, fasteners and/or other suitable fastening technique known by those skilled in the art.

A pair of generally elongated, parallel, spaced-apart locking arms 24 may pivotally connect the wheel abutment plates 8 to the respective ends of the rear frame member 5. As illustrated in FIGS. 2 and 3, each locking arm 24 may have a front end 25 which is pivotally attached to the attachment plate portion 9 of the corresponding wheel abutment plate 8 via a locking arm hinge 28 and a rear end 26 which is pivotally attached to a corresponding end of the rear frame member 5 via an arm hinge 32. Accordingly, as the wheel abutment plate 8 pivots forwardly from the unsecured position illustrated in FIG. 2 to the secured position illustrated in FIG. 3, the locking arms 24 pull the respective wheel engaging members 30 from the lowered, horizontal position illustrated in FIG. 2 to the raised, vertical position illustrated in FIG. 3.

Figure 4:
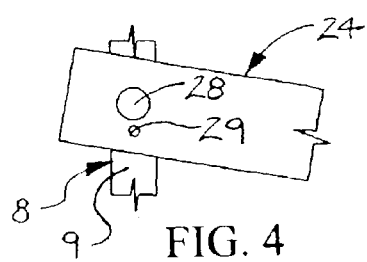
FIG. 4 illustrates an exemplary locking mechanism which is suitable for an illustrative embodiment of the ATV locking device.

As illustrated in FIG. 4, in some embodiments a lock opening 29 may extend through each locking arm 24 generally adjacent to the locking arm hinge 28. A registering lock opening (not illustrated) may be provided in the attachment plate portion 9 of the wheel abutment plate 8. A padlock (not illustrated) or the like may be extended through the registering lock openings and secured to lock the wheel abutment plate 8 and the wheel engaging members 30 in the secured position illustrated in FIG. 3. Alternative locking mechanisms or arrangements which are apparent to those skilled in the art may be used to lock the locking arms 24 relative to the wheel abutment plates 8 and prevent pivoting of the wheel abutment plates 8 and the wheel engaging members 30 in the secured position illustrated in FIG. 3.

In exemplary application, at least one ATV locking device 1 secures an ATV 36 (FIG. 5) on a support surface 40 such as a pickup truck bed or trailer, for example and without limitation. The ATV 36 may be a conventional four-wheeled ATV having a pair of spaced-apart front wheels 37 and a pair of spaced-apart rear wheels 38. In some applications, each ATV locking device 1 may be attached to the support surface 40 by extending bolts 41 (FIGS. 1 and 7) through bolt openings (not illustrated) provided in the respective frame mount plates 6 and into registering bolt openings (not illustrated) provided in the support surface 40. Securing nuts (not illustrated) may be threaded onto the bolts 41. The front frame member 4 of the base frame 2 may be oriented toward the front of the pickup truck bed or trailer whereas the rear frame member 5 may be oriented toward the rear of the pickup truck bed or trailer.

Figure 6:
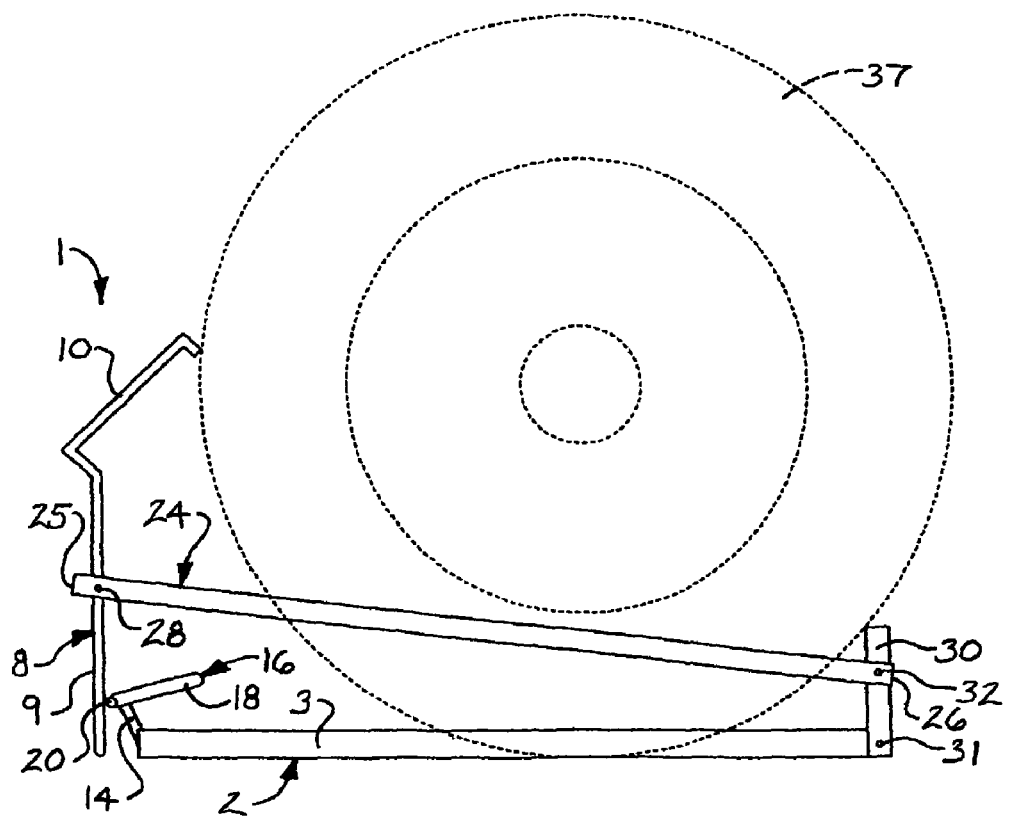
FIG. 6 is a side view of an illustrative embodiment of the ATV locking device, with a front wheel (illustrated in phantom) of an ATV locked in the ATV locking device.

The wheel abutment plates 8 and the wheel engaging members 30 of each ATV locking device 1 are initially deployed in the rearward, unsecured position illustrated in FIG. 2. The ATV 36 is driven forwardly on the support surface 40 toward the ATV locking device 1 until the front wheels 37 of the ATV 36 initially roll over the rear frame member 5 of the base frame 2 and then contact the wheel engaging portions 10 of the respective wheel abutment plates 8. Continued forward movement of the ATV 36 causes the front wheels 37 of the ATV 36 to push forwardly on the wheel abutment plates 8 such that the wheel abutment plates 8 pivot forwardly to the secured position illustrated in FIGS. 3 and 6. Simultaneously, the wheel abutment plates 8 pull the respective locking arms 24 forwardly. In turn, the locking arms 24 pull the wheel engaging members 30 from the lowered, horizontal position illustrated in FIG. 2 to the raised, vertical position illustrated in FIGS. 3, 5 and 6 until the wheel engaging members 30 engage the rear surfaces of the respective front wheels 37 of the ATV 36. Accordingly, while the ATV 36 remains parked, the front wheels 37 of the ATV 36 maintain the wheel abutment plates 8 in the forward, secured position and the wheel abutment plates 8 maintain the wheel engaging members 30 in engagement with the respective front wheels 37 of the ATV 36 to prevent rearward movement of the ATV 36 from the ATV locking device 1. A padlock (not illustrated) may be extended through the lock opening 29 (FIG. 4) provided in the locking arm 24 and in the registering lock opening (not illustrated) in the wheel abutment plate 8 to lock the wheel abutment plates 8 and the wheel engaging members 8 in the secured position. The ATV 36 is removed from the ATV locking device 1 by maneuvering the ATV 36 in reverse such that the front wheels 37 of the ATV 36 disengage the wheel engaging portions 10 of the wheel abutment plates 8, push the wheel engaging members 30 downwardly back to the horizontal position illustrated in FIG. 2 and drive over the rear frame member 5 of the base frame 2.

It will be appreciated by those skilled in the art that various alternative embodiments of the ATV locking device 1 are possible. In some embodiments, the locking arms 24 and the wheel abutment plates 8 may operate manually, electrically or pneumatically according to the knowledge of those skilled in the art. The ATV locking device 1 can be fabricated with various materials and pivot points to fold down and lay flat on the support surface 40 when not in use. In some embodiments, the height, width, shape, material and pivot points on the ATV locking device 1 may be adapted to secure both front wheels 37 and both rear wheels 38 of the ATV 36. The ATV locking device 1 may be fabricated in various sizes to secure a variety of vehicles such as farm tractors, wheel loaders and the like.

Figure 10:
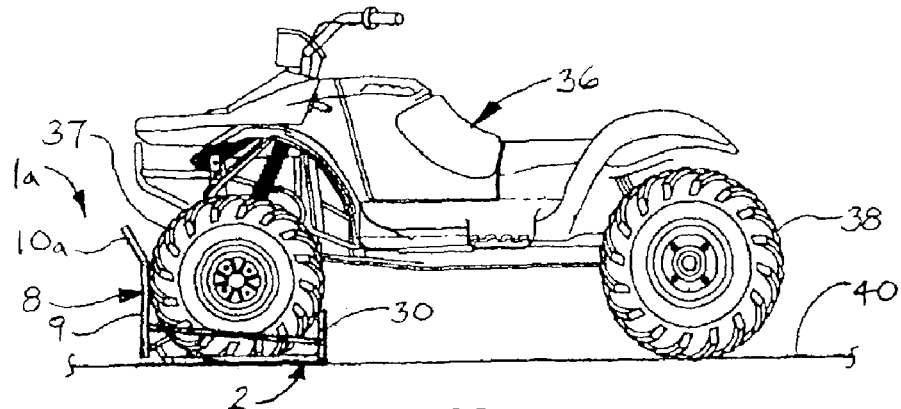
FIG. 10 is a side view of the illustrative embodiment of the ATV locking device illustrated in FIG. 9, with a front wheel of an ATV locked in the ATV locking device.
Figure 11:
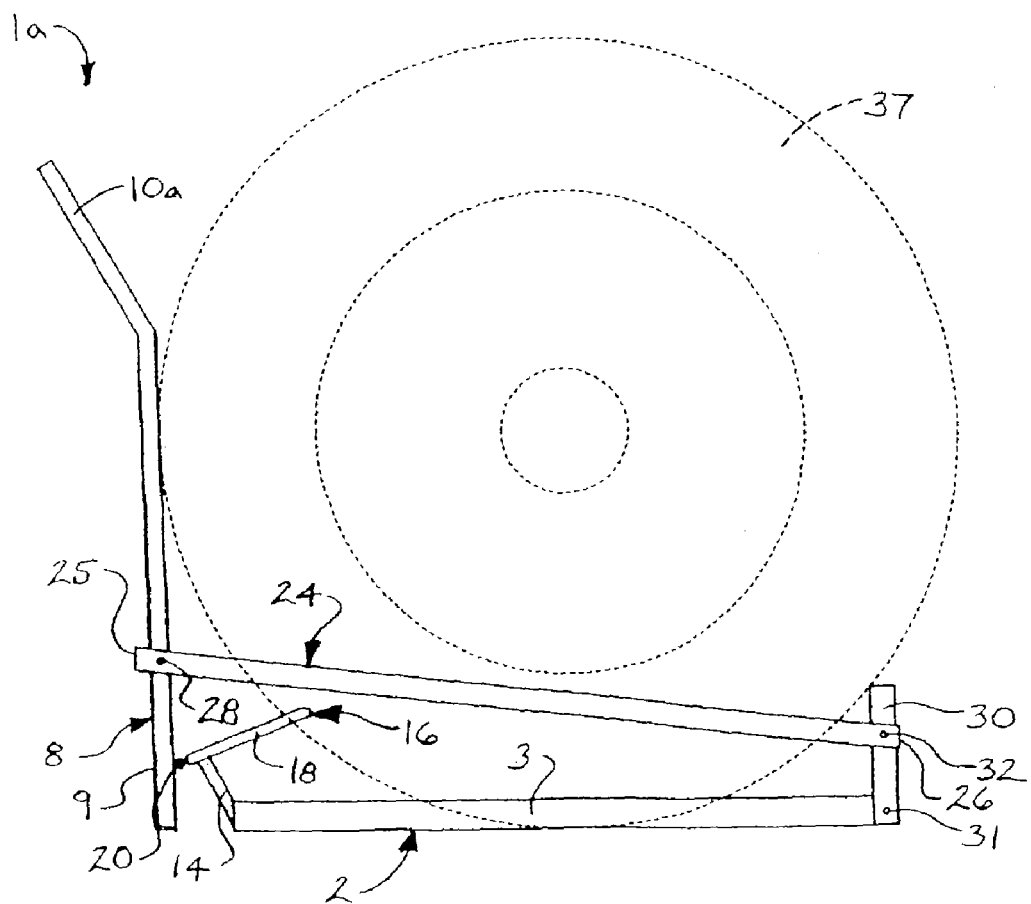
FIG. 11 is a side view of the illustrative embodiment of the ATV locking device illustrated in FIG. 9, with a front wheel (illustrated in phantom) of an ATV locked in the ATV locking device.

Referring next to FIGS. 8-11 of the drawings, an alternative illustrative embodiment of the ATV locking device is generally indicated by reference numeral 1a. The ATV locking device 1a may be similar in design to the ATV locking device 1 which was heretofore described with respect to FIGS. 1-7 except in the ATV locking device 1a, an angled plate portion 10a may angle forwardly from the attachment plate portion 9 of the wheel abutment plate 8. As illustrated in FIGS. 10 and 11, when the ATV 36 is locked in place, the front wheels 37 of the ATV 36 may engage the attachment plate portions 9 of the respective wheel abutment plates 8. The angled plate portions 10a may angle away from the respective front wheels 37 of the ATV 36. When the ATV 36 is removed from the ATV locking device 1a, the wheel abutment plate 8 may pivot back to the unsecured position illustrated in FIG. 8. In some embodiments, the base frame 2 may be detachable from the wheel abutment plate 8 according to the knowledge of those skilled in the art to provide additional storage space on the support surface 40, particularly in applications in which the support surface 40 is in a confined area such as the bed of a pickup truck, for example and without limitation.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. An ATV locking device, comprising:
   a base frame;
   a base wheel stop carried by said base frame, said base wheel stop having a connecting portion carried by said base frame and a pair of spaced-apart side portions extending from said connecting portion;
   at least one wheel abutment plate pivotally carried by said connecting portion of said base wheel stop;
   at least one wheel engaging member pivotally carried by said base frame; and
   at least one locking arm pivotally engaging said at least one wheel abutment plate and said at least one wheel engaging member.

2. The ATV locking device of claim 1 wherein said base frame comprises a pair of generally parallel, spaced-apart side frame members and a front frame member extending between said side frame members.

3. The ATV locking device of claim 1 wherein said wheel abutment plate comprises an attachment plate portion pivotally carried by said base frame and a wheel engaging portion carried by and disposed at an angle with respect to said attachment plate portion.

4. The ATV locking device of claim 1 further comprising at least one connecting plate extending from said base frame and wherein said connecting portion of said base wheel stop is carried by said at least one connecting plate.

5. The ATV locking device of claim 1 further comprising a lock opening provided in said at least one locking arm and said at least one wheel abutment plate.

6. An ATV locking device, comprising:
   a generally rectangular base frame;
   a pair of spaced-apart wheel abutment plates pivotally carried by a first end of said base frame;
   a pair of wheel engaging members pivotally carried by a second end of said base frame; and
   a pair of locking arms pivotally engaging said pair of wheel abutment plates, respectively, and said pair of wheel engaging members, respectively.

7. The ATV locking device of claim 6 wherein said base frame comprises a pair of generally parallel, spaced-apart side frame members and a front frame member extending between said side frame members.

8. The ATV locking device of claim 6 wherein each said wheel abutment plate comprises an attachment plate portion pivotally carried by said base frame and an angled plate portion carried by and disposed at an angle with respect to said attachment plate portion.

9. The ATV locking device of claim 6 further comprising a base wheel stop carried by said base frame and wherein said wheel abutment plates are pivotally carried by said base wheel stop.

10. The ATV locking device of claim 9 wherein said base wheel stop comprises a connecting portion carried by said base frame and a pair of spaced-apart side portions extending from said connecting portion, and wherein said wheel abutment plates are pivotally carried by said connecting portion of said base wheel stop.

11. The ATV locking device of claim 10 further comprising at least one connecting plate extending from said base frame and wherein said connecting portion of said base wheel stop is carried by said at least one connecting plate.

12. The ATV locking device of claim 6 further comprising a lock opening provided in said pair of locking arms and said pair of wheel abutment plates.

* * * * *